United States Patent
Geremew et al.

(10) Patent No.: US 8,857,216 B2
(45) Date of Patent: Oct. 14, 2014

(54) BURNER MODULES, METHODS OF FORMING GLASS SHEETS, AND GLASS SHEETS FORMED THEREBY

(75) Inventors: Muluwork Geremew, Corning, NY (US); Daniel Warren Hawtof, Corning, NY (US); Douglas Miles Noni, Jr., Horseheads, NY (US)

(73) Assignee: Corning Incorporated, Corning, NY (US)

( * ) Notice: Subject to any disclaimer, the term of this patent is extended or adjusted under 35 U.S.C. 154(b) by 273 days.

(21) Appl. No.: 13/484,466

(22) Filed: May 31, 2012

(65) Prior Publication Data

US 2013/0323463 A1 Dec. 5, 2013

(51) Int. Cl.
*C03B 19/06* (2006.01)
*C03B 19/14* (2006.01)

(52) U.S. Cl.
USPC ............. 65/144; 65/17.4; 65/269; 65/355; 65/374.1

(58) Field of Classification Search
CPC ............ C03B 19/1423; C03B 2207/02; C03B 2207/42
USPC .................................. 65/17.4, 144
See application file for complete search history.

(56) References Cited

U.S. PATENT DOCUMENTS

| | | | | |
|---|---|---|---|---|
| 1,998,300 A | * | 4/1935 | Ackermann | 239/273 |
| 2,418,208 A | * | 4/1947 | Walker | 239/553.3 |
| 2,719,581 A | * | 10/1955 | Greathead | 239/132.3 |
| 5,599,371 A | | 2/1997 | Cain et al. | 65/413 |
| 5,922,100 A | * | 7/1999 | Cain et al. | 65/531 |
| 6,328,807 B1 | | 12/2001 | Boek et al. | |
| 6,736,633 B1 | * | 5/2004 | Dawson-Elli et al. | 431/328 |
| 6,743,011 B2 | * | 6/2004 | Bakshi et al. | 431/328 |
| 6,837,076 B2 | * | 1/2005 | Hawtof | 65/413 |
| 7,677,058 B2 | * | 3/2010 | Hawtof et al. | 65/17.4 |
| 8,137,469 B2 | | 3/2012 | Hawtof et al. | |
| 8,746,013 B2 | * | 6/2014 | Geremew et al. | 65/531 |
| 2003/0113679 A1 | * | 6/2003 | Bakshi et al. | 431/154 |
| 2003/0167796 A1 | * | 9/2003 | Hawtof | 65/17.4 |
| 2006/0003279 A1 | | 1/2006 | Best | 431/328 |
| 2008/0280057 A1 | * | 11/2008 | Hawtof et al. | 427/450 |
| 2010/0143601 A1 | * | 6/2010 | Hawtof et al. | 427/446 |
| 2010/0291346 A1 | | 11/2010 | Hawtof et al. | |
| 2011/0167871 A1 | | 7/2011 | Vehmas et al. | 65/25.2 |

FOREIGN PATENT DOCUMENTS

WO 02/14579 2/2002

* cited by examiner

*Primary Examiner* — Jason L Lazorcik
(74) *Attorney, Agent, or Firm* — Michael W Russell (57) ABSTRACT

A burner module comprising a burner gas inlet block, a lower flow plate, an upper flow plate, a burner gas flow disperser, and a burner gas discharge block. The burner gas inlet block, the burner gas flow disperser, and the burner gas discharge block each comprising a plurality of channels separated by partitions. The partitions of the burner gas flow disperser and the burner gas discharge block comprising a knife edge. The upper flow plate and the lower flow plate each comprising a plurality of pressure holes in fluid communication with the plurality of channels. Additionally, the method of forming a glass sheet or ribbon using the disclosed burner module and a glass sheet or ribbon formed using the method.

17 Claims, 5 Drawing Sheets

BURNER MODULES, METHODS OF FORMING GLASS SHEETS, AND GLASS SHEETS FORMED THEREBY

BACKGROUND

1. Field

The present disclosure relates generally to thin glass sheets and ribbons and, more specifically, to burner modules, methods of forming glass sheets and ribbons, and glass sheets and ribbons formed thereby.

2. Technical Background

Glass sheet materials can be formed using a variety of different methods including, for example, float glass processes and fusion draw processes. Glass ribbons are a subset of glass sheets that are thin enough to be rolled into practical size rolls as the glass is thin enough to enable continuous spooling of the material. Float glass is impractical for making ribbons of glass and is generally directed toward thicker sheets. Fusion draw processes are being extended into the thin range to enable ribbons, but are still limited to soft glass compositions with high silica levels and a high softening point. Additionally, silica glass substrates can be produced by cutting, grinding and polishing silica ingots produced in batch flame-hydrolysis furnaces, but this is impractical for glass ribbons. The present inventors have recognized a need for alternatives to the aforementioned processes and, more particularly, economical alternatives for forming uniform, thin glass sheets and ribbons having a high surface quality.

SUMMARY

The present disclosure introduces burner modules, methods of forming glass sheets and ribbons, and glass sheet and ribbons products formed thereby.

In accordance with particular embodiments of the present disclosure, burner modules are provided comprising a burner gas inlet block, a lower flow plate, an upper flow plate, a burner gas flow disperser, and a burner gas discharge block. The burner gas inlet block, the burner gas flow disperser, and the burner gas discharge block each comprising a plurality of channels separated by partitions. The partitions of the burner gas flow disperser and the burner gas discharge block comprise a knife edge. The upper flow plate and the lower flow plate each comprise a plurality of pressure holes in fluid communication with the plurality of channels.

In accordance with further embodiments of the present disclosure, methods of forming glass sheets and ribbons are provided where, the methods comprise depositing a plurality of glass soot particles generated via the disclosed burner modules on a deposition surface of a rotating drum to form a soot sheet, releasing at least part of the soot sheet from the deposition surface of the rotating drum, and sintering at least a part of the soot sheet into densified glass by heating the part of the moving soot sheet to a sintering temperature.

In accordance with still further embodiments of the present disclosure, glass sheet and ribbon products manufactured with the disclosed burner modules are contemplated.

Additional features and advantages of the invention will be set forth in the detailed description which follows, and in part will be readily apparent to those skilled in the art from that description or recognized by practicing the various embodiments described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
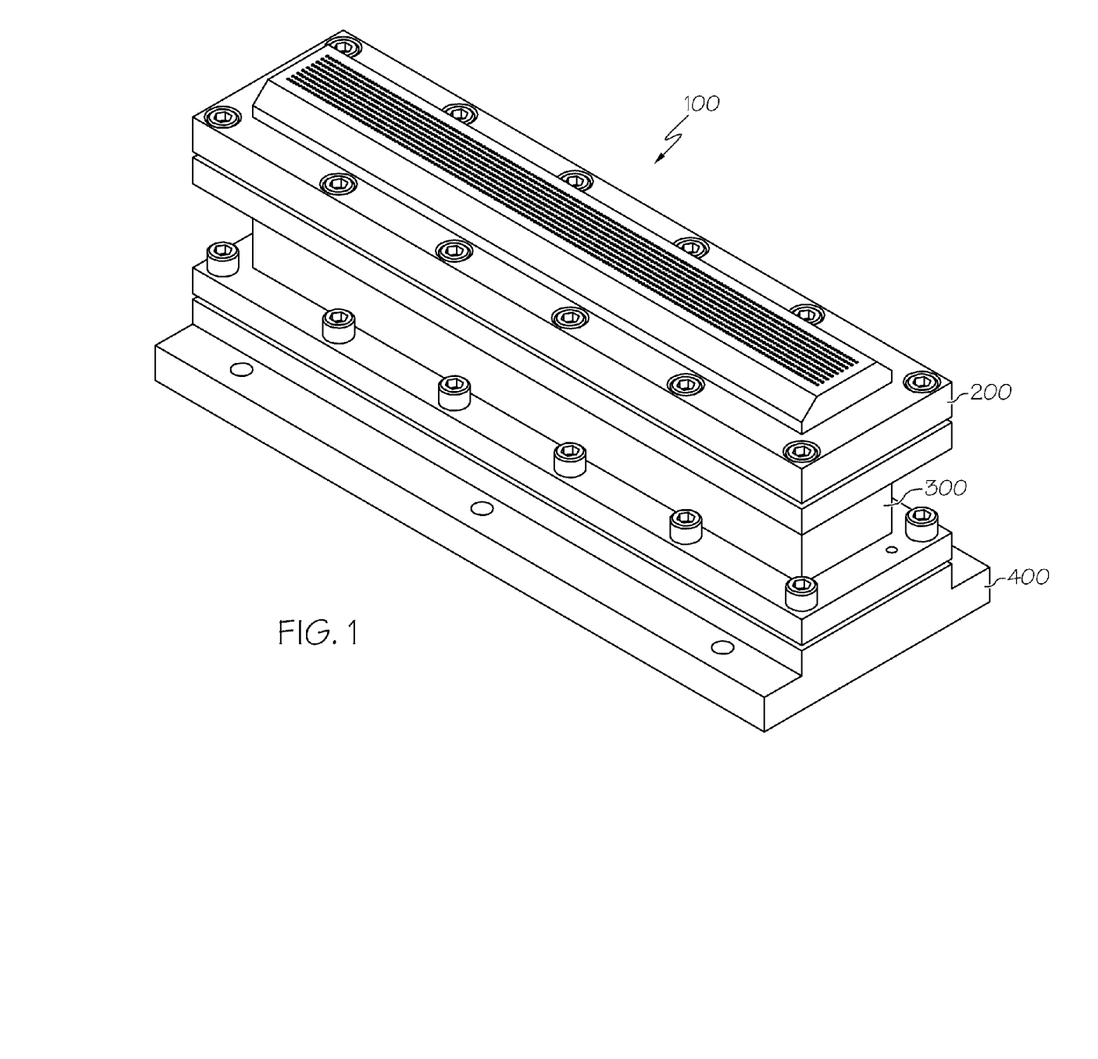
FIG. 1 is a schematic illustration of a burner module according to one embodiment of the present disclosure.

Referring to the drawings in general and to FIG. 1 in particular, it will be understood that the illustrations are for the purpose of describing a particular embodiment of the invention and are not intended to limit the invention thereto.

Figure 2:
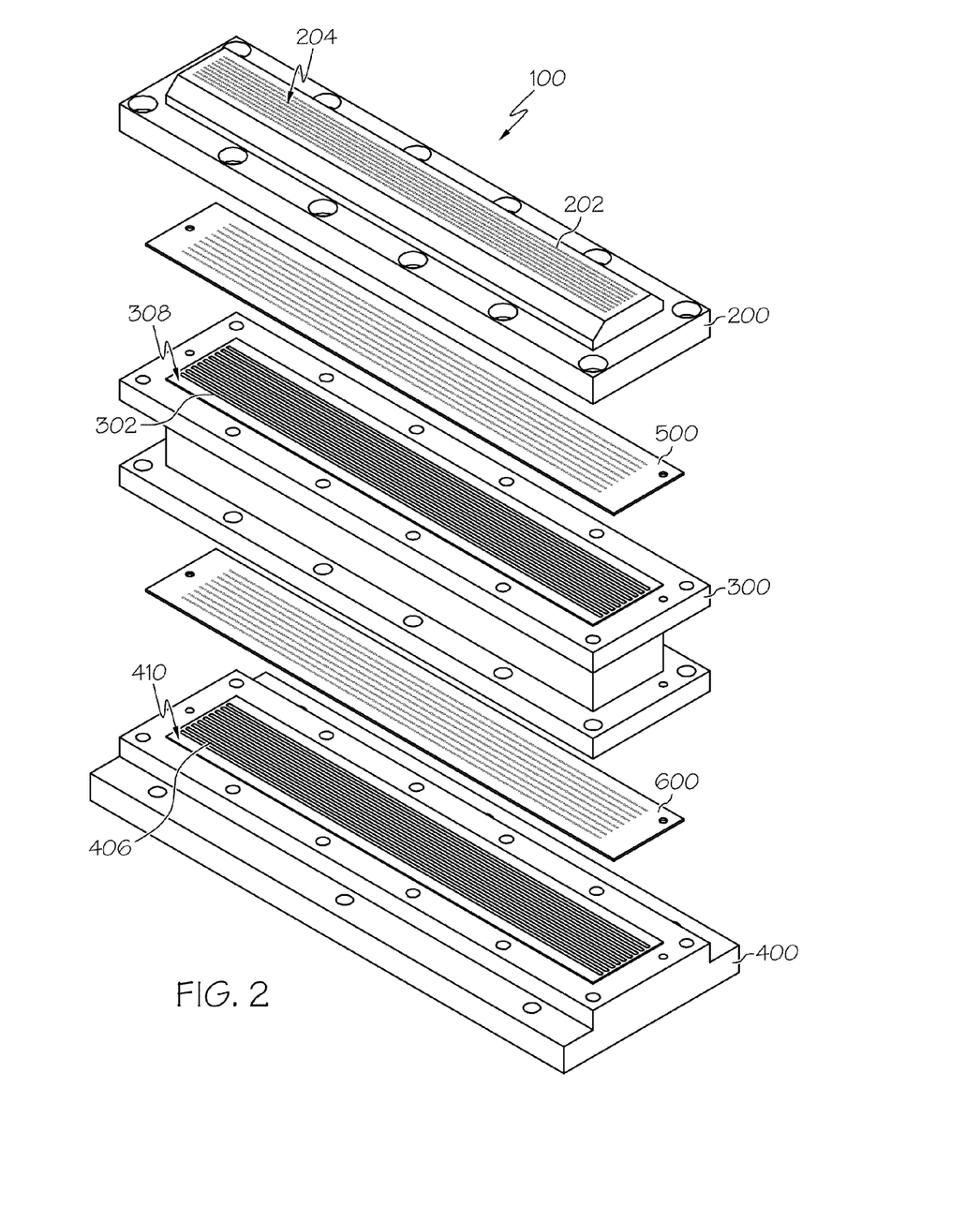
FIG. 2 is an exploded schematic illustration of a burner module according to one embodiment of the present disclosure.

Turning to FIGS. 1 and 2, schematic representations of a burner module are shown assembled and exploded. Burner module 100 comprises a burner gas discharge block 200, a burner gas flow disperser 300, a burner gas inlet block 400, an upper flow plate 500, and a lower flow plate 600. The terms "upper" and "lower" are used simply to distinguish the upper flow plate 500 and the lower flow plate 600 and are not used to limit the relative position of the flow plates as the burner module 100 may be used in many orientations.

Figure 3:
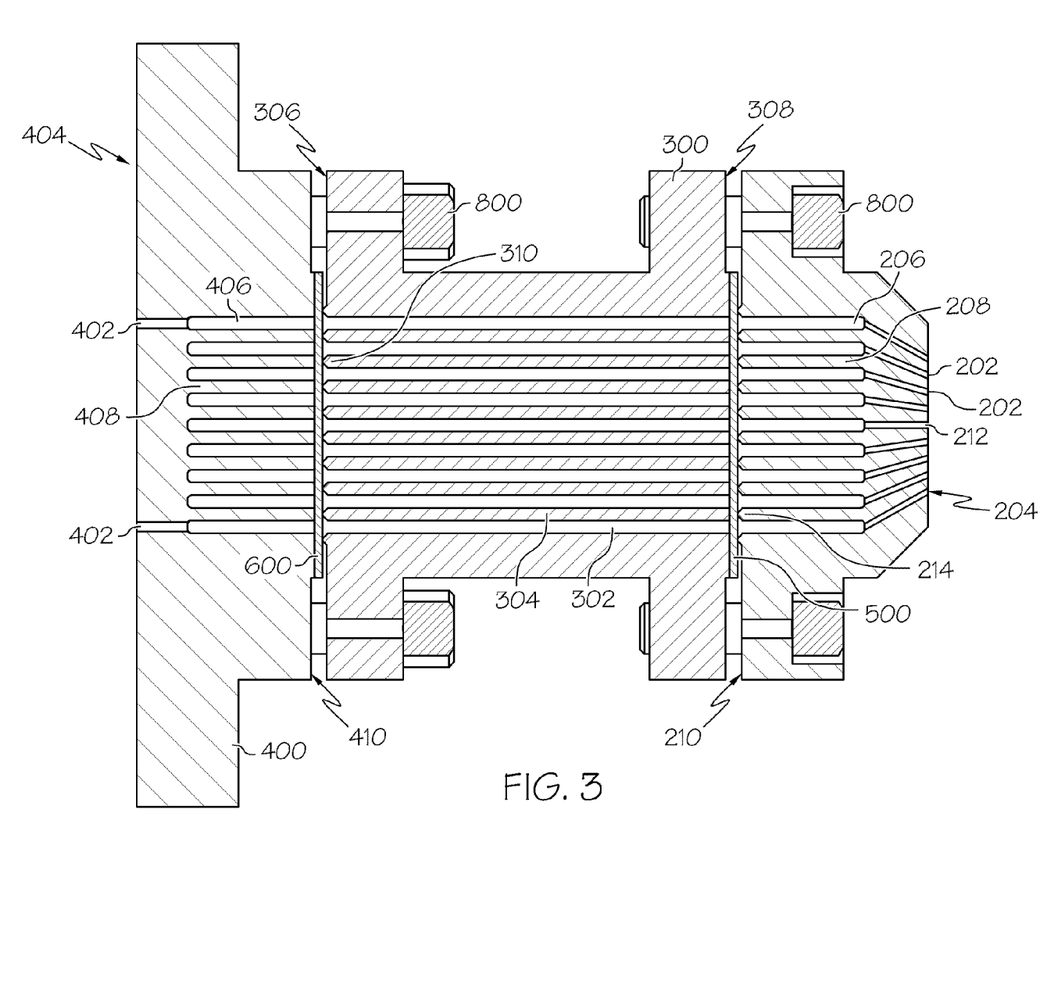
FIG. 3 is a cut side view of a burner module according to one embodiment of the present disclosure.

Referring to FIGS. 2 and 3, the burner gas discharge block 200 comprises a plurality of apertures 202 located on a burner face 204 of the burner gas discharge block. The burner gas discharge block 200 further comprises a plurality of gas discharge channels 206 separated by gas discharge channel partitions 208. The gas discharge channels 206 extend from an inlet face of the burner gas discharge block 210 to a plurality of burner face channels 212. The burner face channels 212 extend from the gas discharge channels 206 to the apertures 202 located on the burner face 204. The gas discharge channel partitions 208 comprise a knife edge upper flow plate contact surface 214 at the inlet face of the burner gas discharge block 210. A knife edge is a portion of a structure with a reduced width.

The burner gas flow disperser 300 comprises a plurality of dispersion channels 302 separated by dispersion channel partitions 304. The dispersion channels 302 extend from an inlet face of the burner gas flow disperser 306 to an outlet face of the burner gas flow disperser 308. The outlet face of the burner gas flow disperser 308 serves as an anvil to the knife edge upper flow plate contact surface 214. The dispersion channel partitions 304 comprise a knife edge lower flow plate contact surface 310 at the inlet face of the burner gas flow disperser 306.

The burner gas inlet block 400 comprises a plurality of gas inlets 402 disposed on a base of the burner gas inlet block 404. The burner gas inlet block 400 further comprises a plurality of gas inlet channels 406 separated by gas inlet channel partitions 408. The gas inlet channels 406 extend from the gas inlets 402 of the burner gas inlet block 400 to an outlet face of the burner gas inlet block 410. The outlet face of the burner gas inlet block 410 serves as an anvil to the knife edge lower flow plate contact surface 310.

Figure 4:
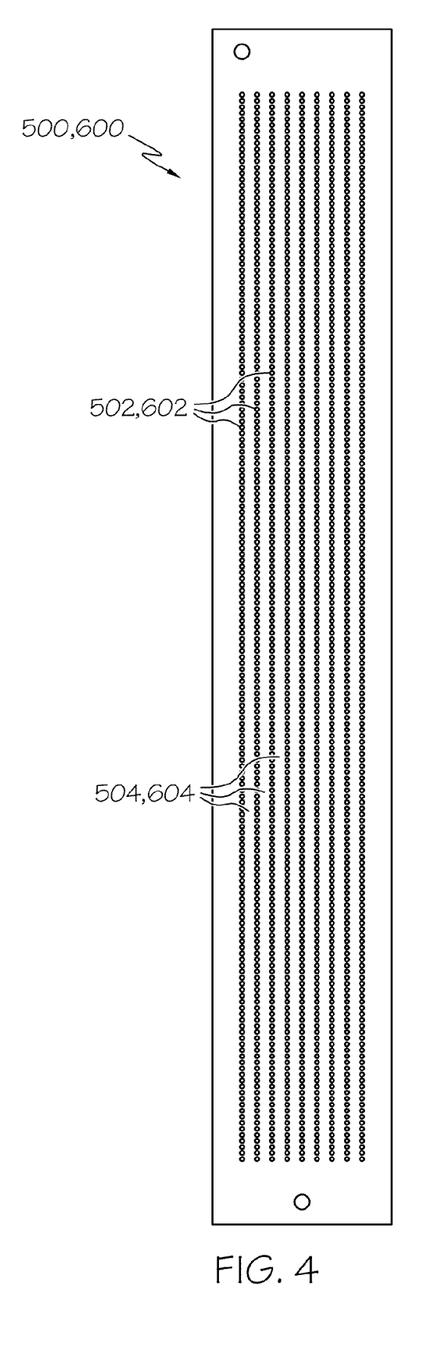
FIG. 4 is a schematic illustration of the upper flow plate or the lower flow plate according to one embodiment of the present disclosure.

Referring to FIG. 4, the upper flow plate 500 comprises a plurality of upper flow plate pressure holes 502 separated by upper flow plate lands 504 extending in a longitudinal direction. Further, each of the plurality of upper flow plate pressure holes 502 is in fluid communication with one of the dispersion channels 302 and one of the gas discharge channels 206.

The lower flow plate 600 comprises a plurality of lower flow plate pressure holes 602 separated by lower flow plate lands 604 extending in a longitudinal direction. Further, each of the plurality of lower flow plate pressure holes 602 is in fluid communication with one of the gas inlet channels 406 and one of the dispersion channels 302.

An insulation package (not shown) may also be included as part of the burner module 100.

The burner module 100 is a modular design. The burner gas discharge block 200, the burner gas flow disperser 300, the burner gas inlet block 400, the upper flow plate 500, and the lower flow plate 600 can each be replaced independent of the other components. The modular nature of the burner module 100 is beneficial both during manufacturing and during application and use of the burner module.

In the manufacturing phase a small defect in a single portion of the burner module 100 as a whole does not necessitate scrapping of the entire assembly. The flawed part alone can be scrapped with the remaining components able to still be used. Additionally, division of the burner module 100 into multiple segments eases difficulty in machining the plurality of channels, pressure holes, and apertures disposed throughout the burner module. Manufacturing the precise internal geometry of the burner module 100 as a single piece would not be possible using traditional machining techniques as there are blind channels inaccessible to tools. Attempts have been made to overcome this challenge by manufacturing other burner units from sintered or photo-cured metals but such endeavors present their own challenges and drawbacks.

During the operational phase of the burner module 100, cleaning the burner module is facilitated by the ability to disassemble and gain access to the plurality of channels, pressure holes, and apertures disposed throughout the burner module. Additionally, should a single component become damaged or flawed in some manner, that single component can be replaced without the need for more costly replacement of the entire unit. This is especially beneficial if the lifespan of all the components of the burner module 100 are not identical.

As illustrated, the components are assembled and retained as a single burner module 100 by means of bolts 800. The bolts 800 should be tightened with sufficient torque to seal the components of the burner module 100 together. An example of a method of tightening the bolts 800, when there are 12 bolts as shown in FIG. 1 for example, is to tighten them in multiple passes in a designated order. Using a torquing sequence which facilities uniform loading of the interfaces of the burner elements the bolts 800 should be tightened to 90 in-lb. This is preferably achieved by tightening each bolt 800 in a non-circumferential order to approximately 30 in-lb, further tightening each bolt to approximately 60 in-lb, and finally further tightening each bolt to approximately 90 in-lb. This procedure can be repeated for each series of bolts 800 connecting components together. Other means of retaining the individual components together, such as rivets, are also envisioned.

Figure 5:
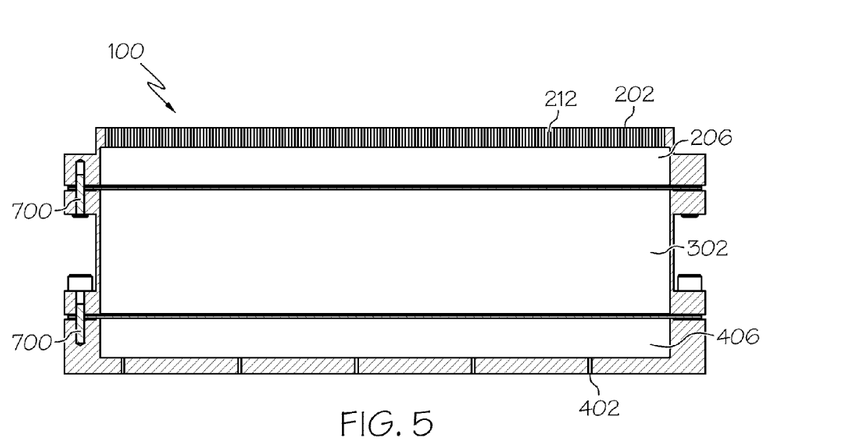
FIG. 5 is a cut front view of a burner module according to one embodiment of the present disclosure.

Referring to FIG. 5, the burner module 100 is configured to deliver a combustion gas, an oxidizer, a soot precursor, and an inert gas through gas inlets 402, gas inlet channels 406, the lower flow plate pressure holes 602, dispersion channels 302, the upper flow plate pressure holes 502, gas discharge channels 206, the plurality of burner face channels 212, and the plurality of apertures 202 to a combustion site in a chemical vapor deposition process to produce a burner flame in a combustion zone proximate to the burner face.

The plurality of gas inlets 402 comprises at least one combustion gas inlet, at least one oxidizer inlet, optionally at least one inert gas inlet, and at least one precursor inlet. The at least one combustion gas inlet provides a combustion gas to the burner module 100 from a combustion gas source, the at least one oxidizer inlet provides an oxidizer to the burner module from an oxidizer source, the at least one inert gas inlet provides an inert gas to the burner module from an inert gas source, and the at least one precursor inlet provides a soot precursor to the burner module from a soot precursor source.

Example combustion gases include methane and hydrogen. An example oxidizer gas is oxygen. An example inert gas is nitrogen. In embodiments, the combustion gas may be premixed with oxygen. A variety of silicon-containing precursor materials may be used as precursor gases. Such precursor materials include, but are not limited to, halide-containing precursors such as silicon tetrachloride; halide-free precursors such as, for example, siloxanes, particularly, polyalkylsiloxanes such as octamethylcyclotetrasiloxane (OMCTS). In addition, appropriate dopants may be used. These dopants may be delivered with the precursor gases to the burner module 100. Alternatively, the dopants may be delivered to the burner module 100 through a separate gas inlet 402 and exit the burner module 100 through a separate aperture 202 or array of apertures.

Figure 6:
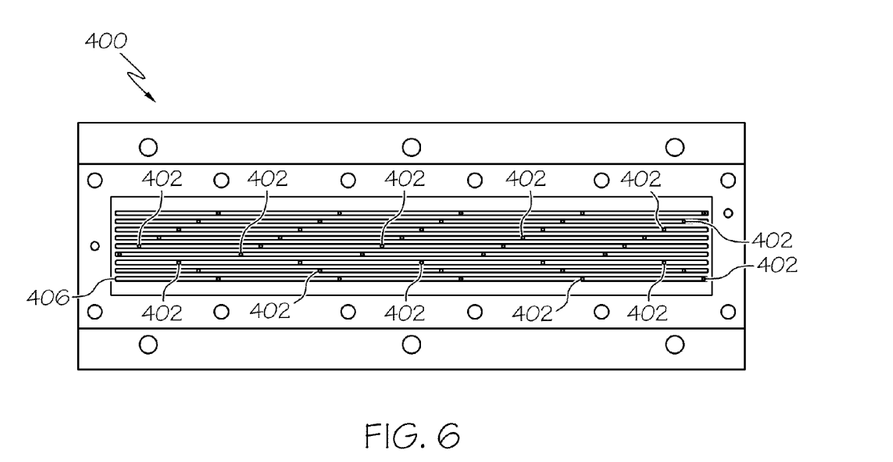
FIG. 6 is a top profile view of a burner gas inlet block according to one embodiment of the present disclosure.

Referring to FIG. 6, in an embodiment, the burner gas inlet block 400 comprises 5 gas inlets 402 for each approximately 8 inches the gas inlet channels 406 are in length. Alternatively, the burner gas inlet block 400 may comprise 3 to 7 gas inlets 402 disposed at the base of each gas inlet channel 406. The individual gas inlets 402 disposed in each gas inlet channel 406 provides the same single input gas or mixture of input gases. For example, a given gas inlet channel 406 which contains a combustion gas such as methane is fed by 3 to 7 gas inlets 402; all of which provide methane. Spreading the gas inlets 402 across each gas inlet channel 406 provides a more uniform distribution of the gas across each gas input channel than a single gas inlet feeding each channel.

The individual gas inlets 402 may also feed pre-mixed gases to each gas inlet channel 406. For example, the combustion gas may comprise methane and oxygen or the soot precursor and an inert gas may be fed pre-mixed to an individual gas inlet 402. In an embodiment the combustion gas source, the oxidizer source, the inert gas source, and/or the soot precursor source comprise a mixture of at least two input media. The input media include the combustion gas, the oxidizer, the soot precursor, and the inert gas.

Exploring the burner gas discharge block 200 in more detail, the apertures 202 are arranged in an overall array on the burner face 204 to equalize the flow of reactant gases across the length and width of the burner module 100 and into the combustion zone. As a result, a uniform flame within the combustion zone is provided, which results in a uniform distribution of soot on the deposition surface. It should be noted that equalization of the flow of reactant gases across the length and width of the burner module 100 is also the result of the other components of the burner gas module including the burner gas flow disperser 300, burner gas inlet block 400, the upper flow plate 500, and the lower flow plate 600, dispersing the reactant gases prior to the burner gas discharge block 200.

The array of apertures 202 may include individual sub-arrays, each having a predetermined number of apertures of pre-selected placement, size, etc. For example, the array of apertures 202 may include an array of apertures for a combustion gas, an array of apertures for an oxidizer, an array of apertures for the precursor gas, and an array of apertures for an inert gas with each array having different aperture placement, size, etc. It is to be understood that the illustrated configuration of apertures 202 in FIGS. 1 and 2 is only a single embodiment, and that other configurations are possible and within the scope of the disclosure. For example, while FIGS. 1 and 2 illustrate consistent aperture 202 placement between the array of apertures for a combustion gas, the array of apertures for an oxidizer, the array of apertures for the precursor gas, and the array of apertures for an inert gas. Any of the sub-arrays may have greater or fewer apertures or rows of apertures than those of the other sub-arrays.

In one particular embodiment, the overall array of apertures 202 includes a plurality of apertures arranged in n parallel columns; wherein n is at least five. An example burner module 100 comprises nine columns of apertures 202. The array of parallel columns has a length l and a width w that is defined by the respective distances between outer edges of the apertures disposed on opposite outer edges of array. In forming silica glass soot, for example, according to one embodiment, the centerline column (e.g., column 5) provides a silica gas precursor/carrier gas mixture. The immediately adjacent columns (e.g., columns 4 and 6) provide oxygen gas for stoichiometry control of the silica gas precursor. The next two columns of gas orifices on either side of the centerline (e.g., columns 2, 3, 7 and 8) provide additional oxygen, the flow rate of which can be used to control stoichiometry and soot density, and provide an oxidizer for the ignition flame. The outermost columns of orifices (e.g., columns 1 and 9) can provide an ignition flame mixture of, for example, $CH_4/O_2$ or $H_2/O_2$.

TABLE 1

Example gas input flow rates for 9-column linear burner module

| Gas | Burner column(s) | Input flow rate |
| --- | --- | --- |
| OMCTS | 5 | 12-15 g/min |
| $N_2$ | 5 | 32-40 SLPM |
| $O_2$ | 4, 6 | 6-18 SLPM |
| $O_2$ | 2, 3, 7, 8 | 24-36 SLPM |
| $CH_4$ | 1, 9 | 36 SLPM |
| $O_2$ | 1, 9 | 30 SLPM |

In accordance with the example burner module 100 comprising nine columns of apertures 202, in a selected embodiment the burner gas inlet block 400 comprises nine gas inlet channels 406, the burner gas flow disperser 300 comprises nine dispersion channels 302, and the burner gas discharge block 200 comprises nine gas discharge channels 206.

The knife edge lower flow plate contact surface 310 and knife edge upper flow plate contact surface 214 each comprise a knife edge width, the dispersion channel partitions 304 and the gas discharge channel partitions 208 each comprise a channel partition width, and the channel partition width is greater than the knife edge width. The knife edge width is preferably approximately 0.005 inches to approximately 0.031 inches. The knife edge width is more preferably approximately 0.010 inches to approximately 0.015 inches. The knife edge width is even more preferably approximately 0.012 inches to approximately 0.013 inches. The channel partition width is preferably approximately 0.04 inches to approximately 0.08 inches. The channel partition width is more preferably approximately 0.05 inches to approximately 0.07 inches.

In a selected embodiment, the knife edge lower flow plate contact surface 310 and knife edge upper flow plate contact surface 214 is a truncated triangular prism.

In an embodiment, a seal is formed by the lower flow plate 600 between the knife edge lower flow plate contact surface 310 of the burner gas flow disperser 300 and the outlet face of the burner gas inlet block 410. The knife edge lower flow plate contact surface 310 of the burner gas flow disperser 300 matches up with the lower flow plate lands 604 of the lower flow plate 600 when the burner module 100 is assembled. The knife edge lower flow plate contact surface 310 and lower flow plate lands 604 interface forms a seal. Further, an additional seal is formed between the planar surfaces of the lower flow plate 600 and the outlet face of the burner gas inlet block 410. The seal between the knife edge lower flow plate contact surface 310 of the burner gas flow disperser 300, the lower flow plate lands 604 of the lower flow plate 600, and the outlet face of the burner gas inlet block 410 is preferably capable of sealing at up to at least 15 psig and more preferably at up to 30 psig.

In an embodiment, a seal is formed by the upper flow plate 500 between the knife edge upper flow plate contact surface 214 of the burner gas discharge block 200 and the outlet face of the burner gas flow disperser 308. The knife edge upper flow plate contact surface 214 of the burner gas discharge block 200 matches up with the upper flow plate lands 504 of the upper flow plate 500 when the burner module 100 is assembled. The knife edge upper flow plate contact surface 214 and upper flow plate lands 504 interface forms a seal. Further, an additional seal is formed between the planar surfaces of the upper flow plate 500 and the outlet face of the burner gas flow disperser 308. The seal between the knife edge upper flow plate contact surface 214 of the burner gas discharge block 200, the upper flow plate lands 504 of the upper flow plate 500, and the outlet face of the burner gas flow disperser 308 is preferably capable of sealing at up to at least 15 psig and more preferably at up to 30 psig.

Without wishing to be bound by theory, it is believed the seal is formed between a flow plate, a knife edge, and the subsequent burner module 100 component because as the knife edge (knife edge lower flow plate contact surface 310 or knife edge upper flow plate contact surface 214) is pressed into a flow plate (lower flow plate lands 604 of the lower flow plate 600 or upper flow plate lands 504 of the upper flow plate 500) the flow plate is deformed and material is pressed out on the back to form a seal against the subsequent burner module component (outlet face of the burner gas inlet block 410 or outlet face of the burner gas flow disperser 308).

In order to ensure that the profile of the burner flame is uniform, each fluid pathway includes at least one flow plate (upper flow plate 500 and lower flow plate 600) between sets of channels for gas expansion (gas inlet channels 406, dispersion channels 302, and gas discharge channels 206). Adjacent gas inlet channels 406 are separated by gas inlet channel partitions 408. Adjacent dispersion channels 302 are separated by dispersion channel partitions 304. Adjacent gas discharge channels 206 are separated by gas discharge channel partitions 208. It will be readily understood by those skilled in the art that burner module 100 could comprise a greater or fewer number of channels, flow plates, and the like than shown. For example, an embodiment of the burner module 100 could not include the burner gas flow disperser 300 and one of the lower flow plate 600 or the upper flow plate 500. In a further embodiment, the burner module 100 could include at least two burner gas flow dispersers 300 and one additional lower flow plate 600 or upper flow plate 500 for each additional burner gas disperser. The only requirement is that each component of the burner module 100 is separated by a flow plate for sealing purposes. The modular nature of the burner module 100 allows for the addition and subtraction of parts as necessary for each specific application.

Channels, flow plates, and other flow-altering or flow-limiting structures described herein, and arrays of apertures 202 serve to equalize the flow of gases along the length l of the burner face 204 of burner module 100, so that the rate and pressure of the flow of gases through the apertures is more uniform. The restricted flow, as a result of the lower flow plate pressure holes 602 and the upper flow plate pressure holes 502, encourages the gases in each respective channel (gas inlet channels 406, dispersion channels 302, and gas discharge channels 206) to spread throughout the channel. As a result, a more uniform flame and distribution of glass precursors is provided. Such uniformity may be characterized in terms of the uniformity in the height of the flame cone, temperature profile of the flame cone, velocity or pressure distributions of gases, and gas concentrations across the width and along the length of the array of apertures 202.

In an embodiment, the upper flow plate 500 and the lower flow plate 600 comprise the same pressure hole number, geometry, and placement. The upper flow plate pressure holes 502 of the upper flow plate 500 match the number, geometry, and placement of the lower flow plate pressure holes 602 of the lower flow plate 600.

In another embodiment, it is envisioned that the upper flow plate 500 and the lower flow plate 600 comprise different pressure hole number, geometry, or placement. The upper flow plate pressure holes 502 of the upper flow plate 500 do not match the number, geometry, and placement of the lower flow plate pressure holes 602 of the lower flow plate 600. The pressure holes of the upper flow plate 500 and the lower flow plate 600 may differ in placement, hole geometry, size, number, or a combination of attributes.

In an embodiment, the upper flow plate 500, the lower flow plate 600, or both comprise at least 150 pressure holes. Each of the upper flow plate pressure holes 502 is in fluid communication with one of the dispersion channels 302 and one of the gas discharge channels 206. Each of the lower flow plate pressure holes 602 is in fluid communication with one of the dispersion channels 302 and one of the gas inlet channels 406.

In another embodiment, the upper flow plate 500, the lower flow plate 600, or both comprise at least 450 pressure holes. Each of the upper flow plate pressure holes 502 is in fluid communication with one of the dispersion channels 302 and one of the gas discharge channels 206. Each of the lower flow plate pressure holes 602 is in fluid communication with one of the dispersion channels 302 and one of the gas inlet channels 406.

In still another embodiment, the upper flow plate 500, the lower flow plate 600, or both comprise at least 1000 pressure holes. Each of the upper flow plate pressure holes 502 is in fluid communication with one of the dispersion channels 302 and one of the gas discharge channels 206. Each of the lower flow plate pressure holes 602 is in fluid communication with one of the dispersion channels 302 and one of the gas inlet channels 406.

In an embodiment of the burner module 100, the upper flow plate 500, the lower flow plate 600, or both comprise circular pressure holes with diameters of approximately 0.020 inches to approximately 0.030 inches. The upper flow plate pressure holes 502 in communication with a single dispersion channel 302 and a single gas discharge channel 206 being disposed along a single line with the centers of the upper flow plate pressure holes spaced approximately 0.030 inches to approximately 0.040 inches apart. The rows of upper flow plate pressure holes 502 are separated by upper flow plate lands 504 with a width of approximately 0.060 inches to approximately 0.180 inches. The lower flow plate pressure holes 602 in communication with a single gas inlet channel 406 and a single dispersion channel 302 being disposed along a single line with the centers of the lower flow plate pressure holes spaced approximately 0.030 inches to approximately 0.040 inches apart. The rows of lower flow plate pressure holes 602 are separated by lower flow plate lands 604 with a width of approximately 0.060 inches to approximately 0.180 inches.

In another embodiment of the burner module 100, the upper flow plate 500, the lower flow plate 600, or both comprise circular pressure holes with diameters of approximately 0.010 inches to approximately 0.030 inches. The upper flow plate pressure holes 502 in communication with a single dispersion channel 302 and a single gas discharge channel 206 being disposed along at least two lines with the centers of the upper flow plate pressure holes spaced approximately 0.015 inches to approximately 0.030 inches apart along each line. The at least two lines of upper flow plate pressure holes 502 may be in alignment or staggered. The groups of rows of upper flow plate pressure holes 502 are separated by upper flow plate lands 504 with a width of approximately 0.060 inches to approximately 0.180 inches. The lower flow plate pressure holes 602 in communication with a single gas inlet channel 406 and a single dispersion channel 302 being disposed along at least two lines with the centers of the lower flow plate pressure holes spaced approximately 0.015 inches to approximately 0.030 inches apart along each line. The at least two lines of lower flow plate pressure holes 602 may be in alignment or staggered. The groups of rows of lower flow plate pressure holes 602 are separated by lower flow plate lands 604 with a width of approximately 0.060 inches to approximately 0.180 inches.

The upper flow plate pressure holes 502 and lower flow plate pressure holes 602 do not have to be circular. The upper flow plate pressure holes 502 and lower flow plate pressure holes 602 may be any geometry including for example, oval, square, triangular, or obround.

In an embodiment, the upper flow plate 500, the lower flow plate 600, or both are manufactured using, for example, photochemical machining (PCM) of a corrosion-resistant alloy plate. An example alloy is a nickel alloy. The alloy used to form the upper flow plate 500 or the lower flow plate 600 can be heat treated to optimize its mechanical properties, including hardness and ductility. The PCM process can be used to form features, such as the upper flow plate pressure holes 502 and the lower flow plate pressure holes 602, with precision and accuracy. For example, the upper flow plate pressure holes 502 and the lower flow plate pressure holes 602 having a diameter of about 0.004 inch+/−0.0005 inch can be formed. Moreover, the PCM process can be used to precisely control the relative position of each flow plate pressure hole. The PCM process allows the upper flow plate pressure holes 502 and the lower flow plate pressure holes 602 to be formed precisely, efficiently, and without machining burrs or tool marks.

As the knife edge upper flow plate contact surface 214 and the knife edge lower flow plate contact surface 310 form a seal with the upper flow plate 500 and lower flow plate 600 respectively, the relative hardness of the two materials is important. The knife edge upper flow plate contact surface 214 and the knife edge lower flow plate contact surface 310 are preferably harder than the upper flow plate 500 and lower flow plate 600 so the upper flow plate and lower flow plate are deformed and the upper flow plate contact surface and the knife edge lower flow plate contact surface retain their shape during assembly.

The knife edge upper flow plate contact surface 214 and the knife edge lower flow plate contact surface 310 preferably have a Rockwell Hardness scale C of at least approximately 50. The upper flow plate 500 and lower flow plate 600 preferably have a Knoop hardness of approximately 94.6 with a 100 gram load on the indenter. Preferably the maximum Knoop hardness with a 100 gram load on the indenter of the upper flow plate 500 and lower flow plate 600 is below 100.

The burner gas inlet block 400, the burner gas flow disperser 300, and the burner gas discharge block 200 are preferably made of hardened steel. More specifically, the burner gas inlet block 400, the burner gas flow disperser 300, and the burner gas discharge block 200 are preferably made of 420 stainless steel. This material allows the components of the burner module 100 to be used in the harsh environment in operation as well as be sufficiently robust and structurally sound. Additionally, 420 stainless steel enables ease of conventional machining.

Referring again to FIG. 5, in an exemplary embodiment, the burner module 100 comprises at least two alignment pins 700 configured to position the burner gas flow disperser 300, the upper flow plate 500, and the burner gas discharge block 200 in alignment.

In a further embodiment, the burner module 100 also comprises at least two alignment pins 700 configured to position the burner gas flow disperser 300, the lower flow plate 600, and the burner gas inlet block 400 in alignment.

The alignment pins 700 ensure that the knife edge upper flow plate contact surface 214 contacts the upper flow plate 500 with the knife edge width disposed on the upper flow plate lands 504. The alignment pins 700 also ensure that the knife edge lower flow plate contact surface 310 contacts the lower flow plate 600 with the knife edge width disposed on the lower flow plate lands 604. Additionally, the gas discharge channels 206, the dispersion channels 302, and the gas inlet channels 406 must be aligned with the upper flow plate pressure holes 502 and the lower flow plate pressure holes 602. The alignment pins 700 ensure the channels and pressure holes are in the proper alignment.

The burner module 100, as a component of an apparatus for forming thin, uniform glass sheets and ribbons, may be used to produce thin glass sheets and ribbons. The apparatus for forming thin, uniform glass sheets and ribbons comprises a soot providing device, a soot-receiving device, a soot sheet-guiding device, and a soot sheet-sintering device.

According to an exemplary method, glass soot particles formed by the soot providing device are deposited on a deposition surface of the soot-receiving device. The soot-receiving device is in the form of a rotatable drum or belt and thus can comprise a continuous deposition surface. The deposited soot particles form a soot layer on the deposition surface. The soot layer, once formed, can be released from the deposition surface as a free-standing, continuous soot sheet. The act of releasing the soot layer from the deposition surface can occur without physical intervention due to, for example, thermal mismatch, a mismatch in coefficients of thermal expansion between the soot layer and the deposition surface and/or under the effect of the force of gravity. After the soot sheet is released from the soot-receiving device, a soot sheet-guiding device can guide movement of the soot sheet through a soot sheet-sintering device, which sinters and consolidates the soot sheet to form a glass sheet. Examples of soot deposition systems are described in U.S. Pat. No. 8,137,469, entitled "Method and Apparatus for Making Fused Silica," by Daniel W. Hawtof et al., filed Dec. 14, 2005.

Thus, a process of forming a thin, uniform glass sheet comprises providing a plurality of glass soot particles, depositing a uniform layer of the glass soot particles on a deposition surface of a soot-receiving device to form a soot layer, releasing the soot layer from the soot-receiving surface to form a soot sheet, and sintering the soot sheet to form a glass sheet or ribbon. An example of a process and apparatus for making glass sheet is described in U.S. Pat. No. 7,677,058, entitled "Process and Apparatus for Making Glass Sheet," by Daniel W. Hawtof et al., filed May 7, 2007. Additional aspects of a process and apparatus for making glass sheet are disclosed in detail herein below.

The soot-providing device may comprise one or more burner module 100, such as those used in outside vapor deposition OVD, vapor axial deposition (VAD) and planar deposition processes. The soot-providing device may comprise a single burner module 100 or multiple burner modules. Optionally, multiple burner modules 100 can be configured into a burner module array that can produce a substantially continuous stream of soot particles over the length and width of the array.

A burner module array, for example, may comprise a plurality of individual burner modules 100 (e.g., placed end-to-end) configured to form and deposit a temporally and spatially uniform layer of glass soot. Burner modules 100 placed end-to-end are preferably modified from the selected embodiment shown in FIG. 1 to remove the lands at the ends of the burner module. Removal of the lands allows the burner faces 204 to be placed closer together and continue in a substantially uninterrupted manner from one burner module 100 to the next. The individual burner modules 100 may be connected together by, for example, adding a knife edge to the modified ends of the burner module and bolting the individual burner modules together to form a seal. Thus, each soot-providing device can be used to form an individual layer of soot having a substantially homogeneous chemical composition and a substantially uniform thickness. By "uniform composition" and "uniform thickness" it is meant that the composition and thickness variation over a given area is less than or equal to approximately 2% of an average composition or thickness. In certain embodiments, one or both of the compositional and thickness variation of a soot sheet can be less than or equal to approximately 1% of their respective average values over the soot sheet. The burner module 100 is resistant to thermal shock and can provide a distributed, even stream of one or more precursor gases to form glass soot.

In embodiments, the disclosed burner module 100 can deliver a uniform flow rate of gas reactants across the outlet face. By "uniform flow rate" it is meant that (a) a gas velocity of a specific aperture 202 at the burner face 204 for any particular gas reactant varies by less than approximately 2% of an average velocity for all the apertures discharging that gas and/or (b) the average gas velocity of the apertures at the burner face for one gas varies by less than approximately 2% of an average velocity of all the apertures for all the gases. By providing a uniform flow rate of gaseous precursors across the outlet face of the burner module, a soot sheet having a uniform thickness can be formed.

Uniformity between the flow rates in each of the apertures 202 allows soot sheets and thin glass sheets to be formed with superb uniformity. Even a single aperture 202 which has a flow rate disproportionately large or small in comparison to the remainder of the apertures can have an effect on the resulting surface topography of the thin glass sheet. An aperture 202 which exhibits a flow rate in excess of the remainder of the apertures results in a raised ridge forming in the resulting thin glass sheet formed from the soot sheet. The additional soot deposited forms a line, potentially visible to the naked human eye, in the thin glass sheet or ribbon. An aperture 202 which exhibits a flow rate deficient in comparison to the remainder of the apertures results in a valley forming in the resulting thin glass sheet formed from the soot sheet or ribbon.

The design and precise manufacturing techniques of embodiments of the burner module 100 allow for line free thin glass sheets to be formed. Line free glass sheets are those where a line is not visible to a naked human eye. Precise and consistent gas flow from each of the apertures 202 forms a soot sheet with consistent mass density throughout allowing for the formation of line free glass. The thin glass sheet formed using the burner module 100 may exhibit peak to valley excursions of less than 0.1 microns (including 0.08 microns, 0.05 microns, 0.03 microns, 0.02 microns, and less than 0.01 microns).

Glass sheets made using the foregoing approach can have an average thickness of 200 microns or less and an average surface roughness over at least one of two major opposing surfaces of 1 nm or less. In an embodiment, an average surface roughness over both of the two major surfaces is 1 nm or less. Example high-silica glass sheets measure at least 2.5× 2.5 $cm^2$. For example, a width of the glass sheet can range from about 2.5 cm to 2 m and a length of the glass sheet—measured in the machine direction—can range from about 2.5 cm to 10 m or more. The length of the glass sheet is limited in principle only by the deposition time, and can extend beyond 10 m to 10 km or more.

Given the precise manufacturing requirements of the burner module 100, traditional machining techniques do not provide a clean, consistent, and sufficiently precise work product. Traditional machining techniques include turning, milling, grinding, drilling and any other process whose material removal mechanism is essentially based on mechanical forces. To achieve the requisite precision, electric discharge machining (EDM) is used to form the apertures 202 on the burner face 204, for example. EDM allows the apertures 202 to be formed with smooth walls and no tool markings or burrs to disrupt flow of gas through them which would result in inconsistent flow between apertures and formation of lines in the finished thin glass sheets.

The machined surfaces of the burner module 100 may optionally be post processed to smooth the walls and apertures. The post processing smoothing operation can be achieved, for example, by passing a deburring, polishing and surface finishing agent such as Extrude Hone® (Kennametal, Irwin, Pa.) through the burner module 100 components.

The soot-providing device may be held stationery during formation and deposition of the soot particles or, alternatively, the soot-providing device may be moved (e.g., oscillated) with respect to the deposition surface. A distance from the burner face 204 to the deposition surface can range from about 20 mm to about 100 mm (e.g., 20, 25, 30, 35, 40, 45, 50, 55, 60, 65, 70, 75, 80, 85, 90, 95 or 100 mm).

As-produced or as-deposited, the soot particles may consist essentially of a single phase (e.g., a single oxide), which can be sintered to form, for example, un-doped, high-purity glass. Alternatively, the soot particles may comprise two or more components or two or more phases, which can be sintered to form, for example, doped glass. Multiphase glass sheets, for example, can be made by incorporating a titanium oxide precursor or a phosphorous oxide precursor into the OMCTS gas flow. Example titanium and phosphorous oxide precursors include various soluble metal salts and metal alkoxides such as halides of phosphorous and titanium (IV) isopropoxide.

Doping can take place in situ during the flame hydrolysis process by introducing dopant precursors into the flame. Dopants can also be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements.

The soot particles can have an essentially homogeneous composition, size and/or shape. Alternatively, one or more of the composition, size and shape of the soot particles can vary. For example, soot particles of a main glass component can be provided by one soot-providing device, while soot particles of a dopant composition can be provided by a different soot-providing device. In certain embodiments, soot particles can mix and/or adhere to one another during the acts of forming and depositing the soot particles to form composite particles. It is also possible that the soot particles are substantially prevented from adhering to each other to form mixed particles prior to or while being deposited on a deposition surface.

As used herein, the singular forms "a," "an" and "the" include plural referents. Recitations herein of "at least one" component, element, etc., should not be used to create an inference that the alternative use of the articles "a" or "an" should be limited to a single component, element, etc.

For the purposes of describing and defining the present invention it is noted that the terms "substantially," "approximately," and "about" are utilized herein to represent the inherent degree of uncertainty that may be attributed to any quantitative comparison, value, measurement, or other representation. The terms "substantially," "approximately," and "about" are also utilized herein to represent the degree by which a quantitative representation may vary from a stated reference without resulting in a change in the basic function of the subject matter at issue.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein of a component of the present disclosure being "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably" and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A burner module comprising a burner gas inlet block, a lower flow plate, an upper flow plate, a burner gas flow disperser, and a burner gas discharge block, wherein:
the burner gas inlet block comprises a plurality of gas inlets disposed on a base of the burner gas inlet block and a plurality of gas inlet channels separated by gas inlet channel partitions, the gas inlet channels extending from the gas inlets of the burner gas inlet block to an outlet face of the burner gas inlet block;
the burner gas flow disperser comprises a plurality of dispersion channels separated by dispersion channel partitions, the dispersion channels extending from an inlet face of the burner gas flow disperser to an outlet face of the burner gas flow disperser;
each of the dispersion channel partitions comprises a knife edge lower flow plate contact surface at the inlet face of the burner gas flow disperser;
the burner gas discharge block comprises a plurality of apertures located on a burner face of the burner gas discharge block and a plurality of gas discharge channels separated by gas discharge channel partitions, the gas discharge channels extending from an inlet face of the burner gas discharge block to a plurality of burner face channels, the burner face channels extending from the gas discharge channels to the apertures located on the burner face;
each of the gas discharge channel partitions comprises a knife edge upper flow plate contact surface at the inlet face of the burner gas discharge block;
wherein the knife edge lower flow plate contact surface and the knife edge upper flow plate contact surface have a hardness in excess of the hardness of the lower flow plate and the upper flow plate;
the lower flow plate comprises a plurality of lower flow plate pressure holes separated by lower flow plate lands extending in a longitudinal direction, wherein each of the plurality of lower flow plate pressure holes is in fluid communication with one of the gas inlet channels and one of the dispersion channels;
the upper flow plate comprises a plurality of upper flow plate pressure holes separated by upper flow plate lands extending in the longitudinal direction, wherein each of the plurality of upper flow plate pressure holes is in fluid communication with one of the dispersion channels and one of the gas discharge channels; and
the burner module is configured to deliver a combustion gas, an oxidizer, a soot precursor, and an inert gas through the gas inlets, the gas inlet channels, the lower flow plate pressure holes, the dispersion channels, the upper flow plate pressure holes, the gas discharge channels, the plurality of burner face channels, and the plurality of apertures to a combustion site in a chemical vapor deposition process to produce a burner flame in a combustion zone proximate to the burner face.

2. The burner module of claim 1 wherein:
the burner module further comprises a combustion gas source, an oxidizer source, an inert gas source, and a soot precursor source;
the plurality of gas inlets comprises at least one combustion gas inlet, at least one oxidizer inlet, at least one inert gas inlet, and at least one precursor inlet;
the at least one combustion gas inlet provides the combustion gas to the burner module from the combustion gas source;
the at least one oxidizer inlet provides the oxidizer to the burner module from the oxidizer source;
the at least one inert gas inlet provides the inert gas to the burner module from the inert gas source; and
the at least one precursor inlet provides the soot precursor to the burner module from the soot precursor source.

3. The burner module of claim 2 wherein:
the combustion gas source, the oxidizer source, the inert gas source, the soot precursor source, or a subset thereof comprises a mixture of at least two input media selected from the group consisting of the combustion gas, the oxidizer, the soot precursor, and the inert gas.

4. The burner module of claim 1 wherein:
the knife edge lower flow plate contact surface and the knife edge upper flow plate contact surface each comprise a knife edge width;
the dispersion channel partitions and the gas discharge channel partitions comprise a channel partition width; and
the channel partition width is greater than the knife edge width.

5. The burner module of claim 4 wherein the channel partition width is greater than the knife edge width by at least one order of magnitude.

6. The burner module of claim 4 wherein the knife edge width is approximately 0.005 inches to approximately 0.031 inches.

7. The burner module of claim 4 wherein:
the knife edge width is approximately 0.005 inches to approximately 0.031 inches; and
the channel partition width is approximately 0.04 inches to approximately 0.08 inches.

8. The burner module of claim 1 wherein the knife edge lower flow plate contact surface or the knife edge upper flow plate contact surface is a truncated triangular prism.

9. The burner module of claim 1 wherein a seal is formed by the lower flow plate between the knife edge lower flow plate contact surface of the burner gas flow disperser and the outlet face of the burner gas inlet block.

10. The burner module of claim 1 wherein a seal is formed by the upper flow plate between the knife edge upper flow plate contact surface of the burner gas discharge block and the outlet face of the burner gas flow disperser.

11. The burner module of claim 1 wherein the upper flow plate, the lower flow plate, or both comprise at least 150 pressure holes in fluid communication with each of the individual gas inlet channels, the individual dispersion channels, or the individual gas discharge channels.

12. The burner module of claim 1 wherein the upper flow plate, the lower flow plate, or both comprise at least 450 pressure holes in fluid communication with each of the individual gas inlet channels, the individual dispersion channels, or the individual gas discharge channels.

13. The burner module of claim 1 wherein the upper flow plate, the lower flow plate, or both comprise pressure holes with diameters of approximately 0.02 inches to approximately 0.03 inches.

14. The burner module of claim 13 wherein the circular pressure holes in communication with a single channel are disposed along a single line with centers of the pressure holes spaced approximately 0.03 inches to approximately 0.04 inches apart.

15. The burner module of claim 1 wherein the upper flow plate, the lower flow plate, or both comprise pressure holes with diameters of approximately 0.01 inches to approximately 0.03 inches and the pressure holes in communication with a single channel are disposed along at least two lines with the centers of the pressure holes spaced approximately 0.015 inches to approximately 0.030 inches apart along each line.

16. The burner module of claim 1 wherein the burner module further comprises at least two alignment pins configured to position the burner gas flow disperser, the upper flow plate, and the burner gas discharge block in alignment.

17. The burner module of claim 1 wherein the burner module further comprises at least two alignment pins configured to position the burner gas flow disperser, the lower flow plate, and the burner gas inlet block in alignment.

* * * * *